US012142409B2

(12) United States Patent
Monma et al.

(10) Patent No.: US 12,142,409 B2
(45) Date of Patent: Nov. 12, 2024

(54) COIL COMPONENT

(71) Applicant: SUMIDA CORPORATION, Tokyo (JP)

(72) Inventors: Toshimasa Monma, Natori (JP); Shin Yamamoto, Natori (JP)

(73) Assignee: SUMIDA CORPORATION (JP)

( * ) Notice: Subject to any disclaimer, the term of this patent is extended or adjusted under 35 U.S.C. 154(b) by 626 days.

(21) Appl. No.: 17/426,153

(22) PCT Filed: Jan. 30, 2020

(86) PCT No.: PCT/JP2020/003562
§ 371 (c)(1),
(2) Date: Jul. 28, 2021

(87) PCT Pub. No.: WO2020/162334
PCT Pub. Date: Aug. 13, 2020

(65) Prior Publication Data

US 2022/0102050 A1 Mar. 31, 2022

(30) Foreign Application Priority Data

Feb. 4, 2019 (JP) ................................ 2019-017743

(51) Int. Cl.
*H01F 27/24* (2006.01)
*H01F 27/29* (2006.01)
*H01F 27/32* (2006.01)

(52) U.S. Cl.
CPC ........... *H01F 27/24* (2013.01); *H01F 27/292* (2013.01); *H01F 27/324* (2013.01)

(58) Field of Classification Search
CPC ...... H01F 27/24; H01F 27/292; H01F 27/324; H01F 27/02; H01F 27/26; H01F 27/2828; H01F 27/325; H01F 27/32
(Continued)

(56) References Cited

U.S. PATENT DOCUMENTS 8,736,411 B2 * 5/2014 Yen ...................... H01F 27/025
336/212
2013/0222100 A1 8/2013 Nomura et al.
(Continued)

FOREIGN PATENT DOCUMENTS

CN 103189942 A 7/2013
CN 104425105 A 3/2015
(Continued)

OTHER PUBLICATIONS

Written Decision on Registration issued in the corresponding Korean Patent Application No. 10-2021-7024313; mailed on Nov. 1, 2023 (total 6 pages).

(Continued)

*Primary Examiner* — Shawki S Ismail
*Assistant Examiner* — Kazi S Hossain
(74) *Attorney, Agent, or Firm* — Harness, Dickey & Pierce, P.L.C.

(57) ABSTRACT

A coil component includes a magnetic core having a core portion; an insulation frame housing the magnetic core; an electrode terminal member provided on the insulation frame; and at least one coil, which is formed of an insulatingly coated lead wire and is electrically connected to the electrode terminal member, wherein at least one coil includes a winding portion wound around the insulation frame and the core portion so as to be in contact with a second wall portion and a fifth wall portion of the insulation frame.

13 Claims, 8 Drawing Sheets

(58) Field of Classification Search
USPC .......................................... 336/221, 83, 198
See application file for complete search history.

(56) References Cited

U.S. PATENT DOCUMENTS

| | | | |
|---|---|---|---|
| 2015/0061811 | A1 | 3/2015 | Takagi et al. |
| 2017/0229229 | A1 | 8/2017 | Kawasaki et al. |
| 2018/0137968 | A1* | 5/2018 | Luk ........................ H01F 27/292 |
| 2018/0261380 | A1 | 9/2018 | Igarashi et al. |
| 2018/0286554 | A1* | 10/2018 | Kojima ................. H01F 17/045 |
| 2018/0330869 | A1* | 11/2018 | Kim .................... H01F 27/2823 |

FOREIGN PATENT DOCUMENTS

| | | | |
|---|---|---|---|
| CN | 108573793 | A | 9/2018 |
| JP | 859-103316 | A | 6/1984 |
| JP | S63-102222 | A | 5/1988 |
| JP | 2009117627 | A * | 5/2009 |
| JP | 2017-143120 | A | 8/2017 |
| JP | 2017-168538 | A | 9/2017 |
| JP | 2018-174219 | A | 11/2018 |

OTHER PUBLICATIONS

Extended European Search Report issued for the corresponding European Patent Application No. 20752798.7; dated Oct. 20, 2022 (total 10 pages).
Office Action issued in the corresponding Chinese Patent Application No. 202080012309.6; dated Oct. 17, 2022 (total 15 pages).
International Search Report (English and Japanese) of the International Searching Authority issued in PCT/JP2020/003562, mailed Mar. 24, 2020; ISA/JP (5 pages).

* cited by examiner

COIL COMPONENT

CROSS REFERENCE TO RELATED APPLICATIONS

This application is a U.S. National Phase Application under 35 U.S.C. 371 of International Application No. PCT/JP2020/003562, filed on Jan. 30, 2020, which claims priority to Japanese Patent Application No. 2019-017743, filed on Feb. 4, 2019. The entire disclosures of the above applications are expressly incorporated by reference herein.

BACKGROUND

Technical Field

The present invention relates to a coil component.

Related Art

As a coil component in the related art, for example, there is one disclosed in JP 63-102222 A.

The coil component of JP 63-102222 A includes an E-shaped first magnetic core, a coil wound around a core portion of the first magnetic core, and an I-shaped second magnetic core arranged on the first magnetic core, a plurality of terminals, and a terminal block for holding the terminals, and a closed magnetic path is formed by the first magnetic core and the second magnetic core.

According to the study by the present inventors, there is room for improvement in the insulation performance between the terminals and the core in the structure of the coil component of JP 63-102222 A.

The present invention has been made in view of the above problems, and provides a coil component having a structure capable of sufficiently ensuring insulation between a terminal and a core.

SUMMARY

According to the present invention, there is provided a coil component including:

- a magnetic core having a core portion;
- an insulation frame housing the magnetic core;
- an electrode terminal member provided on the insulation frame; and
- at least one coil, which is formed of an insulatingly coated lead wire and is electrically connected to the electrode terminal member,
- wherein at least one coil includes a winding portion wound around the insulation frame and the core portion so as to be in contact with an outer surface of the insulation frame.

EFFECT OF THE INVENTION

According to the present invention, since the electrode terminal member is provided on the insulation frame housing the magnetic core, sufficient insulation between the electrode terminal member and the magnetic core can be ensured.

DETAILED DESCRIPTION

Figure 1:
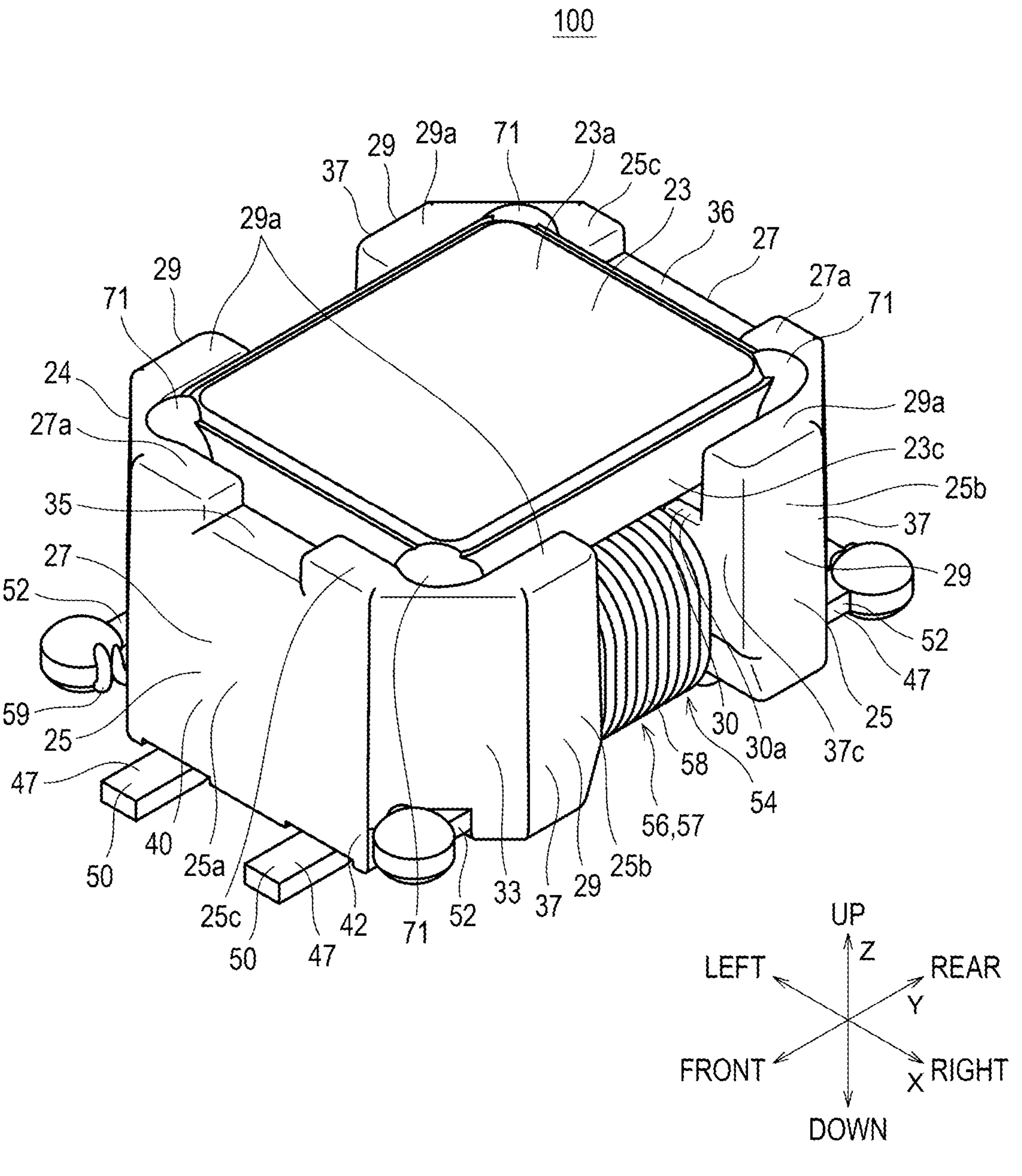
FIG. 1 is a perspective view of a coil component according to an embodiment.

Hereinafter, embodiments of the present invention will be described with reference to the drawings. Note that, in all the drawings, the similar components are denoted by the same reference numerals, and the description thereof will not be repeated.

As illustrated in any of FIGS. 1 to 8, a coil component 100 according to the present embodiment includes a magnetic core 10 (refer to FIGS. 3, 6, 7, and 8) having a core portion 11 (refer to FIGS. 3, 6, 7, and 8), an insulation frame 24 housing the magnetic core 10, an electrode terminal member 47 provided on the insulation frame 24, and at least one coil 54 (for example, two coils 54, a first coil 56 and a second coil 57), which is formed of an insulatingly coated lead wire 55 and is electrically connected to the electrode terminal member 47.

At least one coil 54 has a winding portion 58 wound around the insulation frame 24 and the core portion 11 so as to be in contact with an outer surface of the insulation frame 24.

According to the present embodiment, the coil component 100 has a structure in which the electrode terminal member 47 is provided on the insulation frame 24 that houses the magnetic core 10. Therefore, the insulation between the electrode terminal member 47 and the magnetic core 10 can be easily secured. Therefore, the coil component 100 can be easily miniaturized.

Further, although the winding portion 58 of at least one coil 54 is wound around the insulation frame 24 and the core portion 11 so as to be in contact with the outer surface of the insulation frame 24, the lead wire 55 constituting the coil 54 is insulatingly coated. As a result, even if the winding portion 58 of the coil 54 is in contact with the magnetic core 10, it is possible to secure the insulation between the magnetic core 10 and the coil 54, and the insulation between the magnetic core 10 and the electrode terminal member 47.

In the following description, the vertical direction is referred to as a Z direction. The lower side is the side on which a mounting terminal 50 described later is disposed, that is, the mounting surface side of the coil component 100. However, a positional relationship (particularly a vertical positional relationship) of each portion at the time of manufacturing or using the coil component 100 is not limited to the positional relationship described in this specification.

An axial direction of the core portion 11 extends in a direction orthogonal to the Z direction. The axial direction of the core portion 11 is referred to as a Y direction, one in the Y direction is referred to as the front, and the other is referred to as the rear.

Further, a direction orthogonal to both the Y direction and the Z direction is referred to as the X direction, one in the X direction is referred to as left, and the other is referred to as right.

These directions are shown in each drawing.

Further, in the Y direction, the side on which a center position of the core portion 11 is located in the axial direction is referred to as the inner side, and the side opposite to the inner side is referred to as the outer side. Similarly, in the X direction, the side on which a center position of the core portion 11 is located in a left-right direction is referred to as the inner side, and the side opposite to the inner side is referred to as the outer side.

Further, the direction orthogonal to the Z direction is referred to as horizontal (horizontal direction), and the direction along the Z direction is referred to as vertical (vertical direction).

Note that the axial direction of the core portion 11 also coincides with the direction in which the pair of flange portions 12, which will be described later, face each other. The axial direction of the core portion 11 does not necessarily coincide with a longitudinal direction of the core portion 11. In the case of the present embodiment, a left-right width dimension of the core portion 11 is larger than a dimension of the core portion 11 in the axial direction of the core portion 11.

Figure 3:
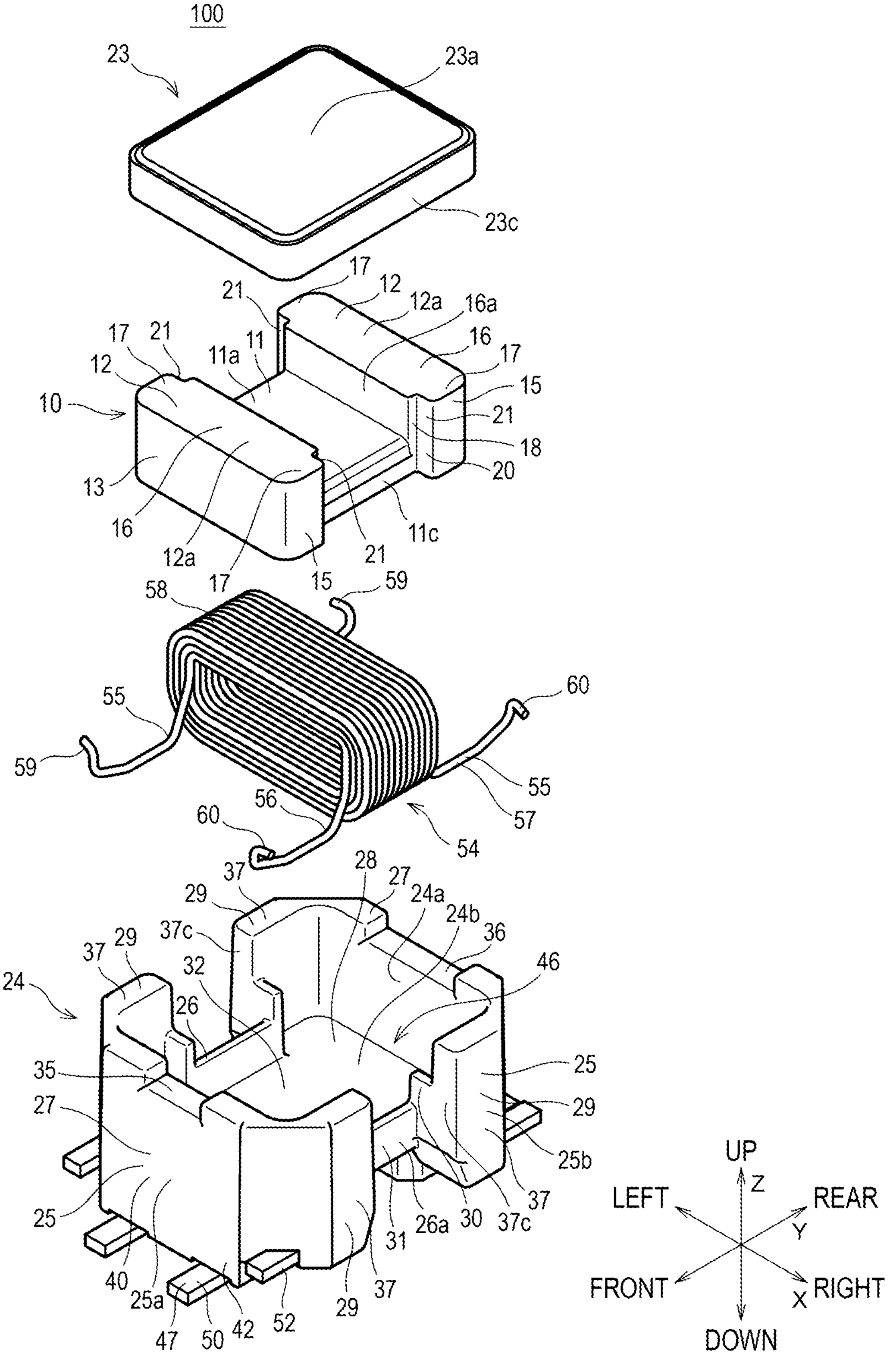
FIG. 3 is an exploded perspective view of the coil component according to the embodiment.

As illustrated in FIG. 3 and the like, the entire magnetic core 10 is integrally formed of a magnetic material such as ferrite.

In the case of the present embodiment, the magnetic core 10 is, for example, a U core. The magnetic core 10 has a pair of (a pair of front and rear) flange portions 12 arranged on both sides of the core portion 11 in the axial direction of the core portion 11.

Each of the pair of flange portions 12 protrudes from the core portion 11 in a direction orthogonal to the axial direction of the core portion 11. In the present invention, the direction in which the flange portion 12 protrudes from the core portion 11 may be a direction having a component in the direction orthogonal to the axial direction of the core portion 11.

In the case of the present embodiment, the flange portion 12 protrudes upward from the core portion 11. Further, the flange portion 12 protrudes from the core portion 11 to either one or both of the left and right sides. That is, each of the pair of flange portions 12 has a base portion 16 disposed on an extension of the core portion 11 in a plan view, and a lateral protruding portion 17 protruding laterally from the base portion 16 (refer to FIG. 7).

More specifically, each of the pair of flange portions 12 has a pair of (a pair of left and right) lateral protruding portions 17 protruding from the base portion 16 on both the left and right sides, respectively. The magnetic core 10 is formed in an H shape in a plan view. That is, the core portion 11 is more constricted than the flange portion 12 (the dimension in the X direction is smaller).

Figure 5:
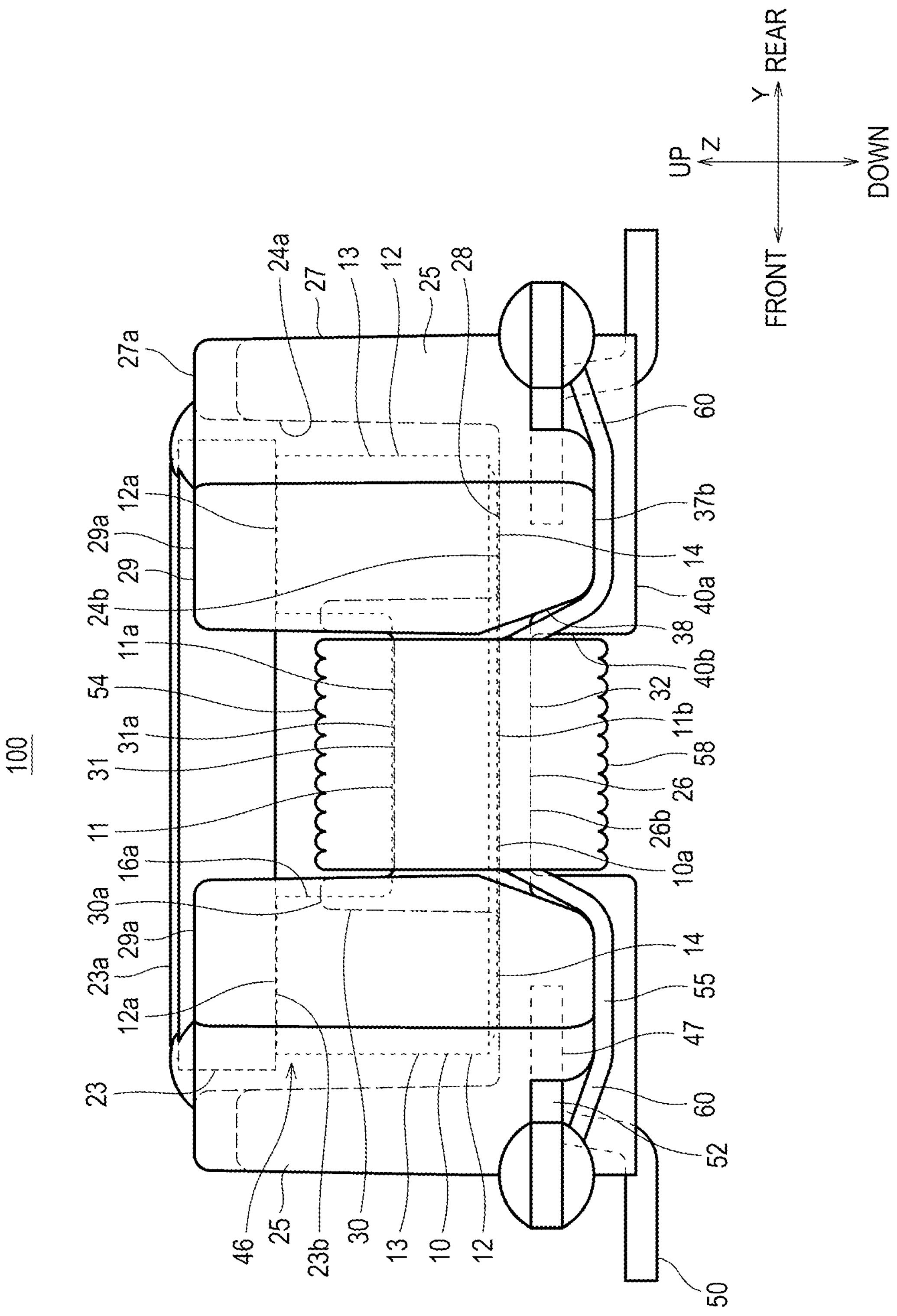
FIG. 5 is a side view of the coil component according to the embodiment.
Figure 6:
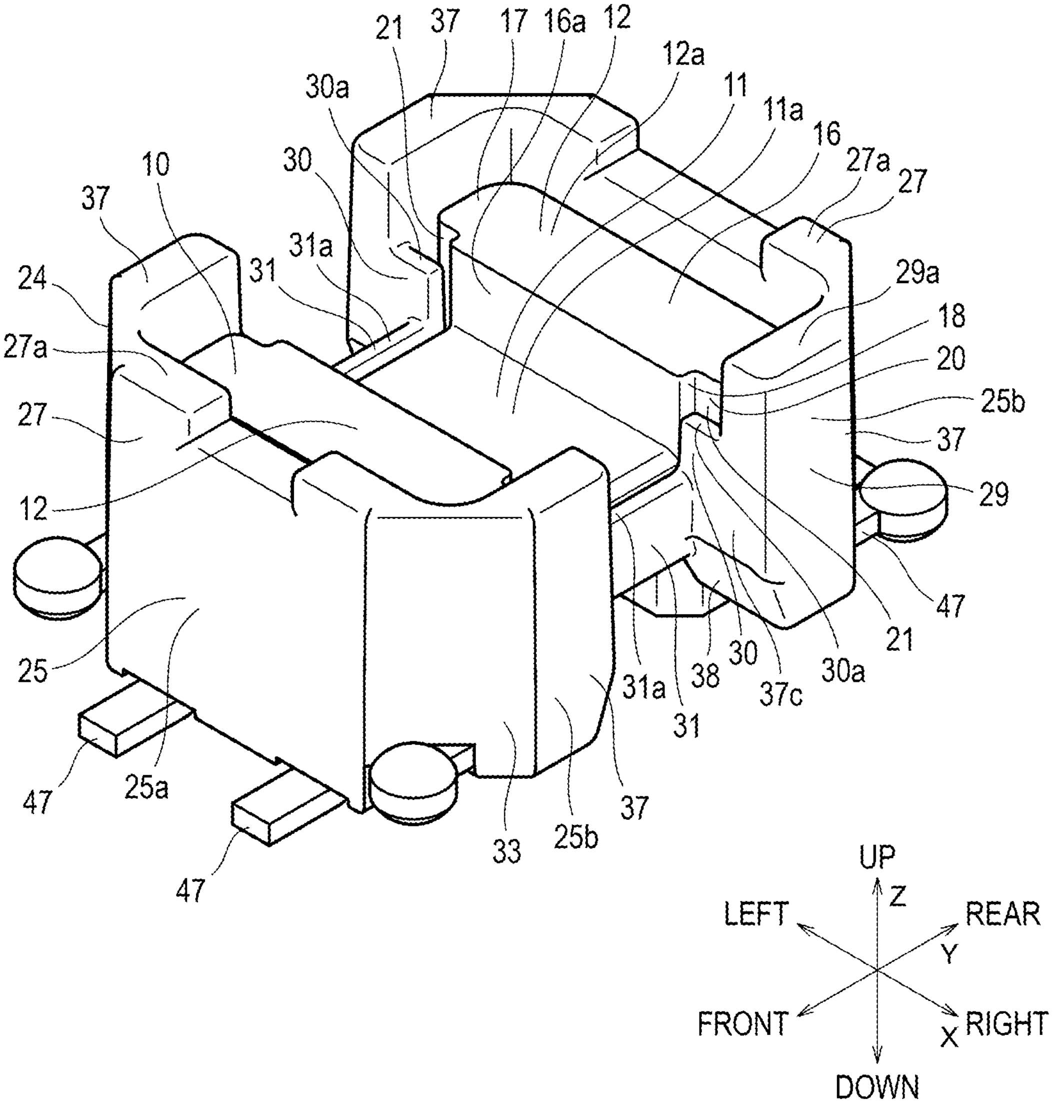
FIG. 6 is a perspective view of the coil component according to the embodiment, illustrating only a magnetic core, an insulation frame, and a metal terminal member.

In the case of the present embodiment, as illustrated in FIG. 5, a lower surface 11*b* of the core portion 11 and a lower surface (second surface 14 described later) of the flange portion 12 are disposed at the same height position as each other. More specifically, substantially an entire lower surface 10*a* (including the lower surface 11*b* and the pair of second surfaces 14) of the magnetic core 10 is formed flat and disposed horizontally.

However, the present invention is not limited to this example, and the flange portion 12 may protrude only upward from the core portion 11, or may not protrude upward and may protrude to either one or both of the left and right sides. Further, the flange portion 12 may protrude downward from the core portion 11.

The core portion 11 is formed, for example, in a rectangular parallelepiped shape having a small vertical dimension (flat), and an upper surface 11*a* and the lower surface 11*b* of the core portion 11 are disposed horizontally, respectively. The core portion 11 has a pair of left and right side surfaces 11*c*, and each of these side surfaces 11*c* is orthogonal to the X direction.

However, the shape of the core portion 11 is not limited to this example, and the core portion 11 may be located between a pair of flange portions 12, and these flange portions 12 may be connected to each other.

Each of the pair of flange portions 12 includes a first surface 13, which faces outward in the axial direction of the core portion 11, a second surface 14 (FIG. 5), which is the lower surface of the flange portion 12, and a third surface 15, which is a side surface of the flange portion 12.

The first surface 13 of the flange portion 12 on the front side is the front surface of the flange portion 12 and the front surface of the magnetic core 10. The first surface 13 of the flange portion 12 on the rear side is the back surface of the flange portion 12 and the back surface of the magnetic core 10.

Each of the pair of flange portions 12 has a pair of left and right third surfaces 15.

Among the outer surfaces of the lateral protruding portion 17, the surface facing the side opposite to the first surface 13 is referred to as a fourth surface 20. Each of the pair of flange portions 12 has a pair of left and right fourth surfaces 20.

A part of the base portion 16 that protrudes upward from the core portion 11 has a surface that faces the side opposite to the first surface 13. This surface is referred to as an inward surface 16*a*.

The fourth surface 20 of the lateral protruding portion 17 is offset outward in the Y direction with respect to the inward surface 16*a* of the base portion 16. That is, the fourth surface 20 of the lateral protruding portion 17 of the flange portion 12 on the front side is located in front of the inward surface 16*a* of the base portion 16 of the flange portion 12 on the front side, and the fourth surface 20 of the lateral protruding portion 17 of the flange portion 12 on the rear side is located behind the inward surface 16*a* of the base portion 16 of the flange portion 12 on the rear side. At a boundary between the inward surface 16*a* and each fourth surface 20, a step surface 18 facing the side is formed, respectively. The step surface 18 on the left side faces the left side, and the step surface 18 on the right side faces the right side.

In other words, recessed portions 21 recessed toward the front side are formed respectively at the rear end portions at the left and right end portions of the flange portion 12 on the front side, and the recessed portions 21 are formed respectively at the front end portions at the left and right end portions of the flange portion 12 on the rear side. Each recessed portion 21 is continuously formed from the upper end to the lower end of the flange portion 12, and is defined by the fourth surface 20 and the step surface 18. Therefore, the recessed portion 21 on the left side in the flange portion 12 on the front side is open upward, downward, leftward, and rearward, the recessed portion 21 on the right side in the flange portion 12 on the front side is open upward, downward, rightward, and rearward, the recessed portion 21 on the left side in the flange portion 12 on the rear side is open upward, downward, leftward, and forward, and the recessed portion 21 on the right side in the flange portion 12 on the rear side is open upward, downward, rightward, and forward.

Further, each of the pair of flange portions 12 has an upper surface 12*a*.

Each of the pair of flange portions 12 is formed, for example, in a rectangular parallelepiped shape. Further, each of the pair of flange portions 12 is formed to be long on the left and right, for example.

The magnetic core 10 is formed, for example, in a symmetrical shape in the left and right direction. That is, the magnetic core 10 has a symmetric shape with respect to a virtual plane orthogonal to the X direction and including the axial center of the core portion 11 (hereinafter, the first virtual plane). Therefore, each of the pair of flange portions 12 is formed symmetrically in the left and right direction, and the pair of left and right lateral protruding portions 17 of each flange portion 12 are formed symmetrically with each other in the left and right direction.

Further, the magnetic core 10 is formed, for example, in a symmetrical shape in the front and rear direction. That is, the magnetic core 10 has a symmetrical shape with respect to a virtual plane orthogonal to the Y direction and located at the center in the axial direction of the core portion 11 (hereinafter, referred to as a second virtual plane). Therefore, the pair of flange portions 12 are formed symmetrically with each other in the front and rear direction.

For example, the first surface 13 is formed in a plane orthogonal to the Y direction, the second surface 14 is formed in a plane orthogonal to the Z direction (that is, horizontal), the third surface 15 is formed in a plane orthogonal to the X direction, each of the fourth surface 20 and the inward surface 16*a* is formed in a plane orthogonal to the Y direction, the step surface 18 is formed in a plane orthogonal to the X direction, and the upper surface 12*a* is formed in a plane orthogonal to (that is, horizontal) the Z axis.

For example, each of the upper surface 12*a,* the second surface 14, and the pair of left and right third surfaces 15 is continuously arranged (connected) to the first surface 13.

Each of the upper surface 12*a,* the second surface 14, and the fourth surface 20 on the left side is continuously arranged (connected) to the third surface 15 on the left side. Each of the upper surface 12*a,* the second surface 14, and the fourth surface 20 on the right side is continuously arranged (connected) to the third surface 15 on the right side.

Each of the upper surface 12*a,* the second surface 14, and the step surface 18 on the left side is continuously arranged (connected) to the fourth surface 20 on the left side. Each of the upper surface 12*a,* the second surface 14, and the step surface 18 on the right side is continuously arranged (connected) to the fourth surface 20 on the right side.

Each of the upper surface 12*a,* the second surface 14, the inward surface 16*a,* and the side surface 11*c* on the left of the core portion 11 is continuously arranged (connected) to the step surface 18 on the left side. Each of the upper surface 12*a,* the second surface 14, the inward surface 16*a,* and the side surface 11*c* on the right of the core portion 11 is continuously arranged (connected) to the step surface 18 on the right side.

Each of the upper surface 12*a* and the upper surface 11*a* of the core portion 11 is continuously arranged (connected) to the inward surface 16*a*.

Note that the boundary between the first surface 13 and each third surface 15, the boundary between each third surface 15 and the corresponding fourth surface 20, and the boundary between each step surface 18 and the inward surface 16*a* are preferably chamfered. Further, the boundary between each of the fourth surface 20 and the step surface 18 corresponding to the fourth surface 20 is also preferably chamfered.

In the case of the present embodiment, the upper surface 12*a* is formed in a planar shape on the entire surface including the peripheral edge thereof, and is disposed horizontally. Then, from the peripheral edge of the upper surface 12*a,* a first surface 13, a pair of left and right third surfaces 15, a pair of left and right fourth surfaces 20, a pair of left and right step surfaces 18, and an inward surface 16*a* hang down. Therefore, the boundary between the upper surface 12*a* and the first surface 13, the boundary between the upper surface 12*a* and each of the pair of left and right third surfaces 15, the boundary between the upper surface 12*a* and each of the pair of left and right fourth surfaces 20, the boundary between the upper surface 12*a* and each of the pair of left and right step surfaces 18, and the boundary between the upper surface 12*a* and the inward surface 16*a* are not chamfered, but are sharply bent corner portions.

The coil component 100 according to the present embodiment further includes a second magnetic core 23 constituting a closed magnetic path together with the magnetic core 10.

The second magnetic core 23 is integrally formed of, for example, the same material as the magnetic core 10 (ferrite or the like).

The second magnetic core 23 is, for example, a plate core and is formed in a flat plate shape. For example, the second magnetic core 23 is formed in a rectangular parallelepiped shape having a small vertical dimension (flat). For example, an upper surface 23*a* and a lower surface 23*b* of the second magnetic core 23 are formed flat and disposed horizontally, respectively.

A side peripheral surface 23*c* of the second magnetic core 23 is, for example, a vertical surface orthogonal to each of the upper surface 23*a* and the lower surface 23*b,* and is formed in a rectangular annular shape in a plan view.

The annular boundary between a peripheral edge portion of the upper surface 23*a* and the upper edge of the side peripheral surface 23*c* preferably has a chamfered shape over the entire circumference.

In the case of the present embodiment, the lower surface 23*b* is formed in a planar shape on the entire surface including the peripheral edge thereof, and is disposed horizontally. The side peripheral surface 23*c* stands vertically from the peripheral edge of the lower surface 23*b*. Therefore, the boundary between the peripheral edge portion of the side peripheral surface 23*c* and the lower edge of the side peripheral surface 23*c* is not chamfered, but is a sharply bent corner portion.

The planar shape of the second magnetic core 23 is, for example, a rectangular shape with a rounded corner. That is, for example, each of the corner portions of the four corners of the side peripheral surface 23*c* is a chamfered portion.

As described above, the insulation frame 24 houses the magnetic core 10. In other words, the second magnetic core 23 covers at least a part of the outer surface of the magnetic core 10.

The insulation frame 24 preferably covers at least a part of the lower surface 10*a* of the magnetic core 10, and more preferably covers the entire lower surface 10*a.*

The insulation frame 24 is formed, for example, in a box shape that is open upward, and the magnetic core 10 can be housed in the insulation frame 24 from above the insulation frame 24.

More specifically, the insulation frame 24 includes an intermediate portion 26 housing the core portion 11 and a pair of (a pair of front and rear) flange housing portions 25 housing each of the pair of flange portions 12. That is, the flange housing portion 25 on the front side houses the flange portion 12 on the front side, and the flange housing portion 25 on the rear side houses the flange portion 12 on the rear side.

As a result, the core portion 11 and the flange portion 12 of the magnetic core 10 can be insulated from the electrode terminal member 47 by the intermediate portion 26 and the flange housing portion 25 of the insulation frame 24, respectively, so that the insulation between the electrode terminal member 47 and the magnetic core 10 can be more reliably secured.

Note that the winding portion 58 of the coil 54 is wound around the core portion 11 and the intermediate portion 26, and is in contact with the outer surface of the intermediate portion 26.

In the case of the present embodiment, the winding portion 58 is located below the lower surface 23*b* of the second magnetic core 23.

Each of the pair of flange housing portions 25 includes a base housing portion 40 housing the base portion 16 of the flange portion 12 and a pair of the left and right lateral protruding housing portions 37 housing each of the pair of the left and right lateral protruding portions 17 of the flange portion 12.

The insulation frame 24 is formed, for example, in a symmetrical shape in the left and right direction. That is, the insulation frame 24 has a symmetrical shape with respect to the above-mentioned first virtual plane. Therefore, each of the pair of flange housing portions 25 is formed symmetrically, and the pair of left and right lateral protruding housing portions 37 of each flange housing portion 25 are formed symmetrically with each other in the left and right direction.

Further, the insulation frame 24 is formed, for example, in a symmetrical shape in the front and rear direction. That is, the insulation frame 24 has a substantially symmetrical shape with respect to the above-mentioned second virtual plane. Therefore, the pair of flange housing portions 25 are formed substantially symmetrically with each other in the front and rear direction.

Each of the pair of flange housing portions 25 has a first wall portion 27 covering the first surface 13, a second wall portion 28 covering the second surface 14, a pair of left and right third wall portions 29 covering each of the pair of left and right third surfaces 15, and a pair of left and right fourth wall portions 30 covering each of the pair of left and right fourth surfaces 20. That is, the fourth wall portion 30 covers the fourth surface 20 which is a surface of the outer surface of the lateral protruding portion 17, facing the side opposite to the first surface 13.

Since the insulation frame 24 has the fourth wall portion 30, the lateral protruding portion 17 of the flange portion 12 can be insulated from the electrode terminal member 47 by the insulation frame 24, and the insulation between the electrode terminal member 47 and the magnetic core 10 can be more reliably secured.

It is preferable that the first wall portion 27 is substantially parallel to the first surface 13 and faces the first surface 13. The second wall portion 28 is preferably substantially parallel to the second surface 14 and faces the second surface 14, and more preferably in surface contact with the second surface 14. It is preferable that the third wall portion 29 is substantially parallel to the third surface 15 and faces the third surface 15. It is preferable that the fourth wall portion 30 is substantially parallel to the fourth surface 20 and faces the fourth surface 20.

More specifically, for example, the first wall portion 27 covers the entire surface of the first surface 13, the second wall portion 28 covers the entire surface of the second surface 14, and the third wall portion 29 covers the entire third surface 15.

Further, the fourth wall portion 30 covers at least the lower portion of the fourth surface 20. The fourth wall portion 30 also covers at least the lower portion of the step surface 18.

Here, the flange housing portion 25 on the front side will be described. Note that, since the flange housing portion 25 on the rear side is formed substantially symmetrically in the front and rear direction with the flange housing portion 25 on the front side, overlapping description will not be repeated.

The substantially planar shape of the flange housing portion 25 on the front side corresponds to the planar shape of the flange portion 12 on the front side, and for example, the flange portion 12 has a shape that is one size larger.

The second wall portion 28 constitutes a lower end portion of the flange housing portion 25. The upper surface of the second wall portion 28 is, for example, formed flat as a whole and is disposed horizontally.

The first wall portion 27 stands upward from the front edge of the second wall portion 28. The thickness direction of the first wall portion 27 is the Y direction. For example, the dimensions of the first wall portion 27 in the X direction and the Z direction are larger than the thickness dimension of the first wall portion 27.

The third wall portion 29 on the left side stands upward from the left edge of the second wall portion 28. A front edge portion of the third wall portion 29 on the left side and a left edge portion of the first wall portion 27 are connected to each other.

The third wall portion 29 on the right side stands upward from the right edge of the second wall portion 28. A front edge portion of the third wall portion 29 on the right side and a right edge portion of the first wall portion 27 are connected to each other.

The third wall portions 29 on the left and right are arranged so as to face each other.

The thickness direction of each third wall portion 29 is the X direction. For example, the dimensions of the third wall portion 29 in the Y direction and the Z direction are larger than the thickness dimension of the third wall portion 29.

The fourth wall portion 30 on the left side stands upward from the rear edge of the second wall portion 28 at the portion corresponding to the lateral protruding portion 17 on the left side. The left edge portion of the fourth wall portion 30 on the left side and the rear edge portion of the third wall portion 29 on the left side are connected to each other. The fourth wall portion 30 on the left side is arranged so as to face the left end portion of the first wall portion 27. That is, the fourth wall portion 30 is adjacent to the third wall portion 29 and faces the first wall portion 27.

The fourth wall portion 30 on the right side stands upward from the rear edge of the second wall portion 28 at the portion corresponding to the lateral protruding portion 17 on the right side. The right edge portion of the fourth wall portion 30 on the right side and the rear edge portion of the third wall portion 29 on the right side are connected to each other. The fourth wall portion 30 on the right side is arranged so as to face the right end portion of the first wall portion 27.

The flange housing portion 25 on the front side is open upward.

The flange housing portion 25 on the front side has an outward surface 25*a* which is an outer surface on the outer side (that is, the front side) of the flange housing portion 25, and a pair of left and right side surfaces 25*b*. The outward surface 25*a* is a front-facing vertical surface, the side surface 25*b* on the left side is a left-facing vertical surface, and the side surface 25*b* on the right side is a right-facing vertical surface.

Similarly, the flange housing portion 25 on the rear side has an outward surface 25*a* which is an outer surface on the outer side (that is, the rear side) of the flange housing portion 25, and a pair of left and right side surfaces 25*b*.

For example, on the outer surface of the flange housing portion 25, the boundary between the outward surface 25*a* and the side surface 25*b* on the left side and the boundary between the outward surface 25*a* and the side surface 25*b* on the right side are chamfered shape portions 33, respectively. The chamfered shape portion 33 is a vertical surface inclined with respect to both the outward surface 25*a* and the side surface 25*b*.

The position of the chamfered shape portion 33 in the plan view also corresponds to the boundary between the first wall portion 27 and each third wall portion 29. Therefore, the thickness dimension at the boundary between the first wall portion 27 and the third wall portion 29 is getting smaller as compared with the thickness dimension of the other portion of the first wall portion 27 and the thickness dimension of the other portion of the third wall portion 29.

The upper end surface of the first wall portion 27 is formed flat, for example, and extends horizontally to the left and right. Note that, recessed portions 35 and 36, which will be described later, are respectively formed on the upper end surface of the first wall portion 27 on the front side and the upper end surface of the first wall portion 27 on the rear side.

The upper end surface of the third wall portion 29 is formed flat, for example, and extends horizontally to the front and rear.

The upper edge of the fourth wall portion 30, for example, extends horizontally to the left and right.

Here, in the flange housing portion 25, the upper end surface of a part including the first wall portion 27 and the pair of third wall portions 29 is referred to as the upper end surface 25*c* of the flange housing portion 25.

For example, the recessed portion 35 recessed downward is formed on the upper end surface 25*c* of the flange housing portion 25 on the front side. The upper end surface 25*c* of the flange housing portion 25 on the front side is formed flat except for the portion where the recessed portion 35 is formed, and is disposed horizontally.

Similarly, a recessed portion 36 recessed downward is formed on the upper end surface 25*c* of the flange housing portion 25 on the rear side. The upper end surface 25*c* of the flange housing portion 25 on the rear side is formed flat except for the portion where the recessed portion 36 is formed, and is disposed horizontally.

In the case of the present embodiment, the recessed portion 35 is formed on the upper end surface of the first wall portion 27 on the front side, and the recessed portion 36 is formed on the upper end surface of the first wall portion 27 on the rear side. More specifically, for example, each of the recessed portion 35 and the recessed portion 36 is arranged at the center of the upper end surface of the corresponding first wall portion 27 in the left-right direction, and is formed over the entire area (entire area in the front-rear direction) of the first wall portion 27 in the thickness direction.

The left-right width dimensions of the recessed portion 35 and the recessed portion 36 are different from each other, and it is possible to identify the front-rear direction of the coil component 100.

The base housing portion 40 is configured to include, for example, a portion of the first wall portion 27 excluding the left and right end portions and a portion of the second wall portion 28 excluding the left and right end portions.

The lateral protruding housing portions 37 on the left and right are arranged adjacent to each other on both of the left and right sides of the base housing portion 40.

The lateral protruding housing portion 37 on the left side is configured to include, for example, a left end portion of the first wall portion 27, a left end portion of the second wall portion 28, the third wall portion 29 on the left side, and the fourth wall portion 30 on the left side. The lateral protruding housing portion 37 on the left side includes the chamfered shape portion 33 on the left side and the side surface 25*b* on the left side.

The lateral protruding housing portion 37 on the right side is configured to include, for example, a right end portion of the first wall portion 27, a right end portion of the second wall portion 28, the third wall portion 29 on the right side, and the fourth wall portion 30 on the right side. The lateral protruding housing portion 37 on the right side includes the chamfered shape portion 33 on the right side and the side surface 25*b* on the right side.

The side surface 25*b* on the left side of the flange housing portion 25 is the side surface of the lateral protruding housing portion 37 on the left side, the side surface 25*b* on the right side of the flange housing portion 25 is the side surface of the lateral protruding housing portion 37 on the right side, and the outward surface 25*a* of the flange housing portion 25 is the outward surface of the base housing portion 40.

Each of the lateral protruding housing portions 37 on the left and right has, for example, an inward surface 37*c* that is a vertical surface facing inward. The inward surface 37*c* is, for example, orthogonal to the Y direction. The inward surface 37*c* on the left side includes the inward surface of the fourth wall portion 30 on the left side and the inward surface of the third wall portion 29 on the left side. The inward surface 37*c* on the right side includes the inward surface of the fourth wall portion 30 on the right side and the inward surface of the third wall portion 29 on the right side.

Each of the lateral protruding housing portions 37 on the left and right includes a lower surface 37*b*. Each lower surface 37*b* is formed flat, for example, and is disposed horizontally.

At the boundary between the inward surface 37*c* and the lower surface 37*b*, a chamfered shape portion 38 inclined with respect to both the inward surface 37*c* and the lower surface 37*b* is formed.

The base housing portion 40 has a lower surface 40*a* and an inward surface 40*b*.

The inward surface 40*b* is, for example, a vertical surface facing inward. The inward surface 40*b* is, for example, orthogonal to the Y direction.

Note that, in the Y direction, a position of the inward surface 37*c* on the front side and a position of the inward surface 40*b* on the front side are substantially equal to each other, and a position of the inward surface 37*c* on the rear side and a position of the inward surface 40*b* on the rear side are substantially equal to each other.

Figure 2:
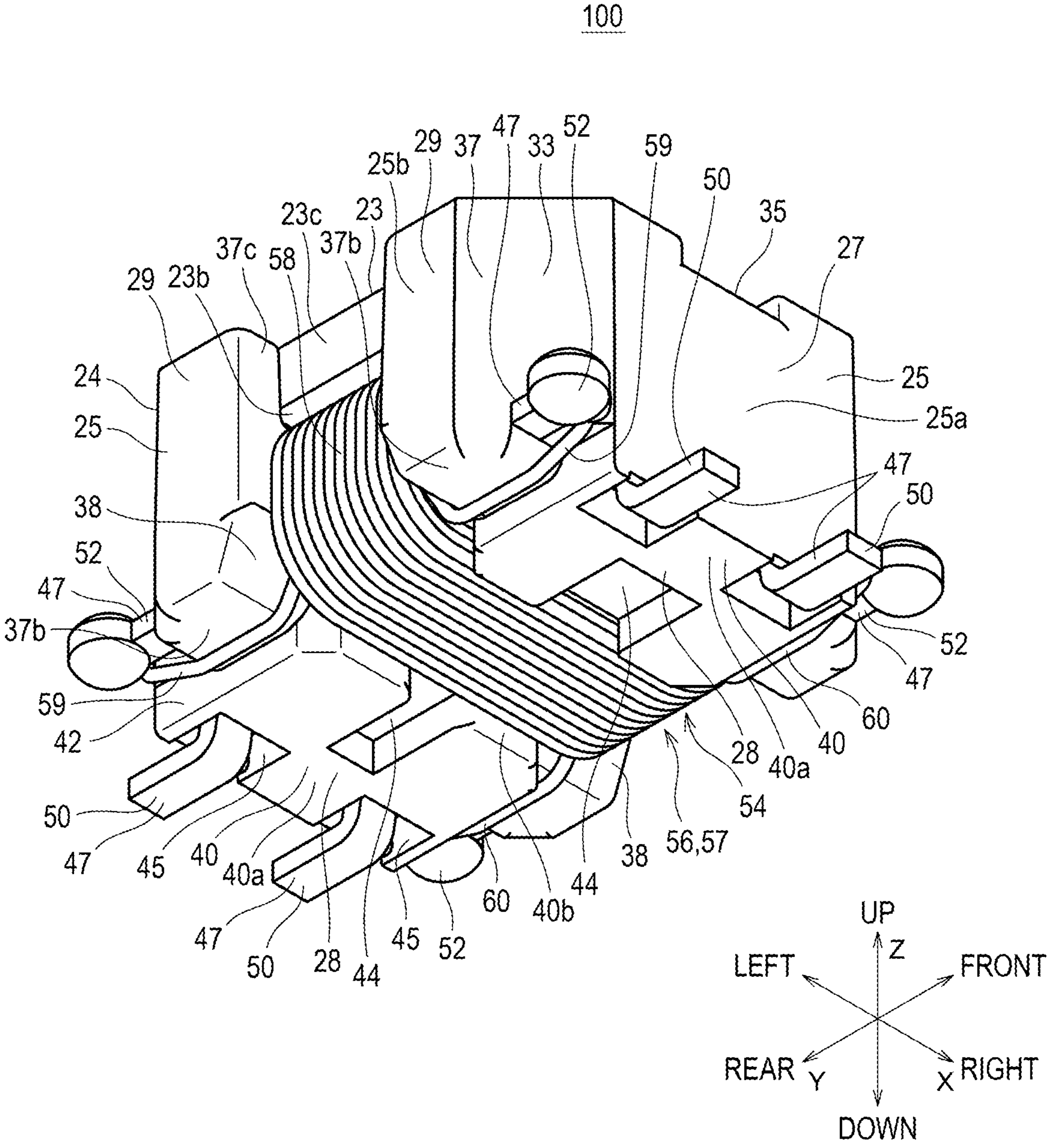
FIG. 2 is a perspective view of the coil component according to the embodiment as viewed from a lower surface side.
Figure 8:
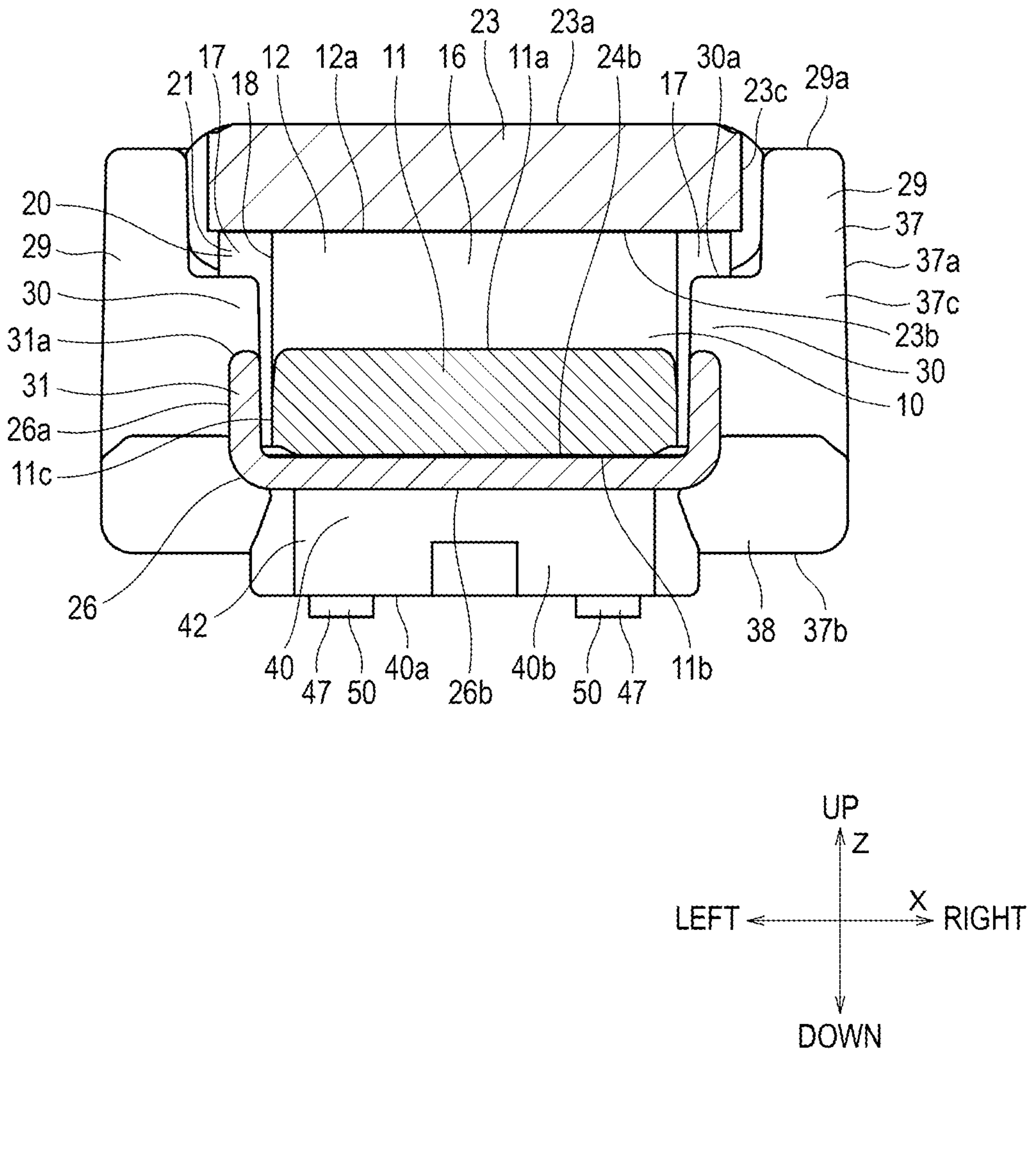
FIG. 8 is a cross-sectional view taken along line A-A of FIG. 4 (here, the illustration of the coil is not given).

A height position of the lower surface 37*b* of the lateral protruding housing portion 37 on the left and right is higher than a height position of the lower surface 40*a* of the base housing portion 40 (refer to FIGS. 2, 5, and 8). Therefore, a step is formed at the boundary between the lower surface 40*a* and the lower surface 37*b* of the lateral protruding housing portion 37 on the left and right.

The lower surface 40*a* is, for example, the lowermost surface of the insulation frame 24.

The lower surface 40*a* is formed flat, for example, and is disposed horizontally. Note that, as illustrated in FIG. 2, the lower surface 40*a* is formed with, for example, a terminal protruding hole 45 that is open downward and a recessed portion 44 for chucking.

The terminal protruding holes 45 are formed at the left end portion and the right end portion of the front end portion of the base housing portion 40 on the front side, respectively, and the terminal protruding holes 45 are formed at the left end portion and the right end portion of the rear end portion of the base housing portion 40 on the rear side, respectively.

The recessed portion 44 of the base housing portion 40 on the front side is formed in the central portion of the rear portion of the base housing portion 40 in the left-right direction, and is open downward and rearward. The recessed portion 44 of the base housing portion 40 on the rear side is formed in the central portion of the front portion of the base housing portion 40 in the left-right direction, and is open downward and forward. That is, the recessed portion 44 is open in the inward surface 40*b*.

The approximate planar shape of the intermediate portion 26 corresponds to the planar shape of the core portion 11, for example, the core portion 11 is slightly enlarged in the left-right direction.

The intermediate portion 26 includes a pair of (a pair of left and right) fifth wall portions 31 that cover each of the pair of left and right side surfaces 11*c* of the core portion 11, and a sixth wall portion 32 that covers the lower surface 11*b* of the core portion 11. The pair of fifth wall portions 31 are arranged so as to face each other.

It is preferable that the fifth wall portion 31 is substantially parallel to the side surface 11*c* and faces the side surface 11*c*. The sixth wall portion 32 is preferably substantially parallel to the lower surface 11*b* to face the lower surface 11*b*, and more preferably in surface contact with the lower surface 11*b*.

More specifically, for example, the sixth wall portion 32 covers the entire surface of the lower surface 11*b*, and each fifth wall portion 31 covers at least the lower portion of each side surface 11*c*.

The front edge portion of the sixth wall portion 32 is connected to a portion of the second wall portion 28 of the flange housing portion 25 on the front side corresponding to the base portion 16 of the flange portion 12 on the front side. The rear edge portion of the sixth wall portion 32 is connected to a portion of the second wall portion 28 of the flange housing portion 25 on the rear side corresponding to the base portion 16 of the flange portion 12 on the rear side.

The fifth wall portion 31 on the left side stands upward from the left edge portion of the sixth wall portion 32. The front edge portion of the fifth wall portion 31 on the left side is connected to the right edge portion of the fourth wall portion 30 on the left side in the flange housing portion 25 on the front side. The rear edge portion of the fifth wall portion 31 on the left side is connected to the right edge portion of the fourth wall portion 30 on the left side in the flange housing portion 25 on the rear side.

Similarly, the fifth wall portion 31 on the right side stands upward from the right edge portion of the sixth wall portion 32. The front edge portion of the fifth wall portion 31 on the right side is connected to the left edge portion of the fourth wall portion 30 on the right side of the flange housing portion 25 on the front side, and the rear edge portion of the fifth wall portion 31 on the right side is connected to the left edge portion of the fourth wall portion 30 on the right side of the flange housing portion 25 on the rear side.

The intermediate portion 26 is open upward.

The thickness direction of the fifth wall portion 31 is the X direction. For example, the dimensions of the fifth wall portion 31 in the Y direction and the Z direction are larger than the thickness dimension of the fifth wall portion 31.

The thickness direction of the sixth wall portion 32 is the Z direction. For example, the dimensions of the sixth wall portion 32 in the Y direction and the X direction are larger than the thickness dimension of the sixth wall portion 32.

The intermediate portion 26 has a pair of left and right side surfaces 26*a* and a lower surface 26*b*. The side surface 26*a* is an outer surface of the fifth wall portion 31. The side surface 26*a* has, for example, a flat vertical surface and is orthogonal to the X direction. The lower surface 26*b* is a lower surface of the sixth wall portion 32. The lower surface 26*b* is, for example, a flat horizontal surface.

The upper edge of the fifth wall portion 31 extends horizontally to the front and rear.

Note that it is preferable that the boundary between the lower surface 26*b* and each side surface 26*a* and the boundary between the upper edge of the fifth wall portion 31 and the side surface 26*a* have a chamfered shape.

As illustrated in FIGS. 5 and 8, the height position of the lower surface 26*b* is preferably higher than the height position of the lower surface 40*a* of the base housing portion 40.

Figure 7:
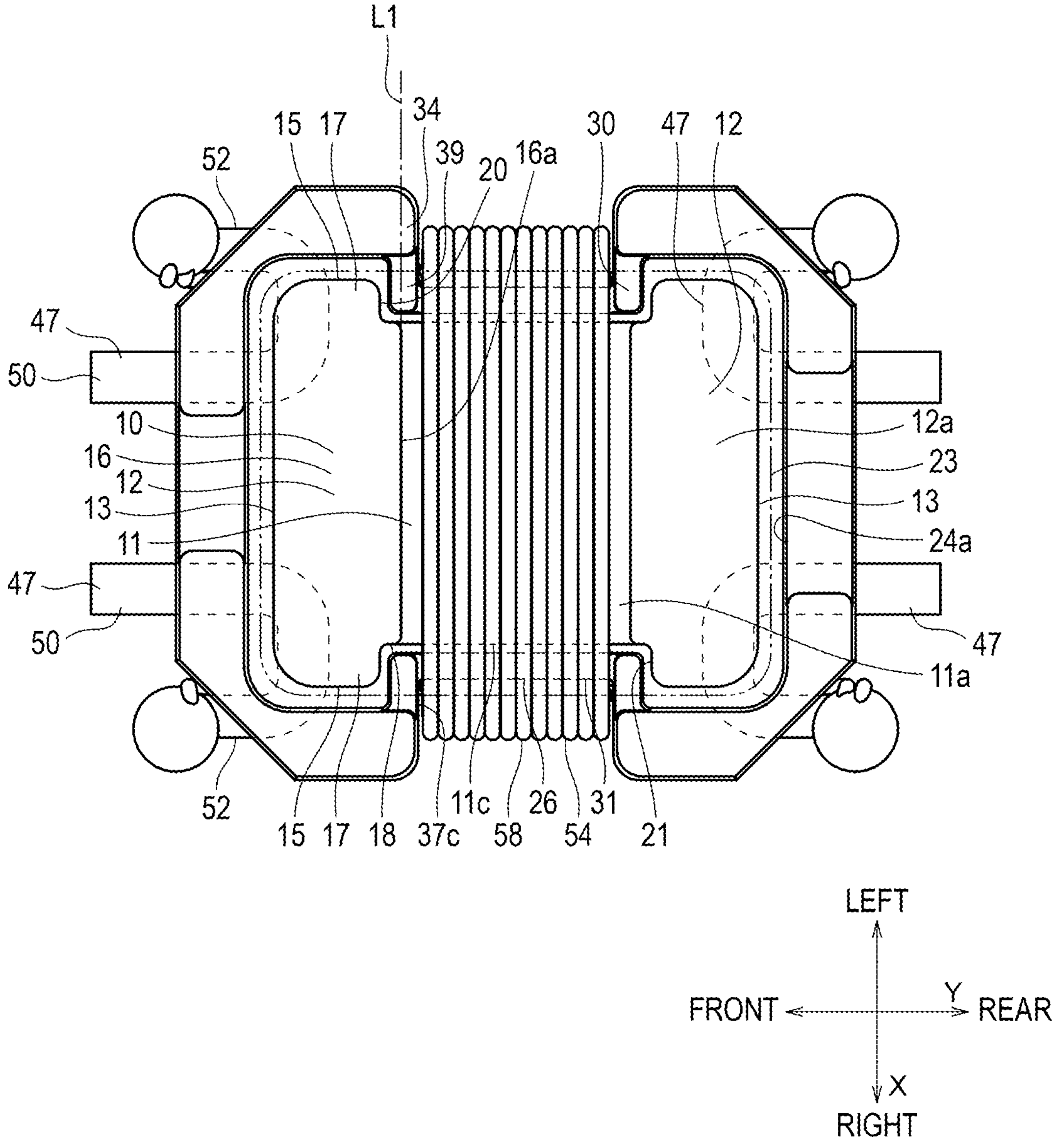
FIG. 7 is a plan view of the coil component according to the embodiment (here, the illustration of a second magnetic core is not given).

In a plan view, the approximate shape of the insulation frame 24 corresponds to the shape of the magnetic core 10. That is, as illustrated in FIG. 7, the insulation frame 24 is formed in an H shape in a plan view, and the intermediate portion 26 is more constricted than the flange housing portion 25 (the dimension in the X direction is small).

Here, a surface including upper surfaces of the pair of the second wall portions 28 on the front and rear and the upper surface of the sixth wall portion 32 is referred to as an internal bottom surface 24*b*. The internal bottom surface 24*b* is formed flat as a whole and is disposed horizontally.

Further, a part of the inner peripheral surface of the insulation frame 24 excluding the internal bottom surface 24*b* is referred to as an inner peripheral wall surface 24*a*. In a plan view, the shape of the inner peripheral wall surface 24*a* corresponds to the shape of the magnetic core 10. Each part of the inner peripheral wall surface 24*a* has a flat vertical surface.

A region in which the internal space of the intermediate portion 26 and the internal space of the pair of flange housing portions 25 on the front and rear are combined is referred to as a housing region 46 (FIGS. 3 and 5).

The entire insulation frame 24 is integrally molded with an insulating material such as a resin.

The insulation frame 24 is configured as described above.

The magnetic core 10 is housed in the housing region 46 in a state where the lower surface 10*a* of the magnetic core 10 is in contact with the internal bottom surface 24*b*. For example, the lower surface 10*a* of the magnetic core 10 is adhesively fixed to the internal bottom surface 24*b*.

In the case of the present embodiment, at least the lower end portion of the second magnetic core 23 is housed in the housing region 46. Note that the dimension of the second magnetic core 23 in the Y direction is larger than the facing distance between the inward surfaces 16*a* of the flange portions 12 on the front and rear and smaller than the facing distance between the first wall portions 27 on the front and rear. The dimension of the second magnetic core 23 in the X direction is smaller than the facing distance between the third wall portions 29 on the left and right, and preferably larger than the distance between the step surfaces 18 on the left and right.

The inner peripheral wall surface 24*a* surrounds the circumference (side circumference) of the magnetic core 10 and surrounds the circumference (side circumference) of the second magnetic core 23.

Here, the upper surfaces 12*a* of the pair of flange portions 12 are disposed on the same plane as each other. As illustrated in FIG. 5, the second magnetic core 23 is horizontally spanned between the upper surfaces 12*a* of the pair of flange portions 12. More specifically, for example, substantially the entire upper surface 12*a* of each of the pair of flange portions 12 is in surface contact with the lower surface 23*b* of the second magnetic core 23.

On the other hand, the height position of the lower surface 23*b* of the second magnetic core 23 is higher than the height position of the upper surface 11*a* of the core portion 11 and an upper end 31*a* of the fifth wall portion 31, and in a side view, there is a gap between the lower surface 23*b* of the second magnetic core 23 and the upper surface 11*a* of the core portion 11 and the upper end 31*a* of the fifth wall portion 31. The coil 54 is wound through this gap.

In the case of the present embodiment, the second magnetic core 23 is fixed to the insulation frame 24 by an adhesive 71.

Figure 4:
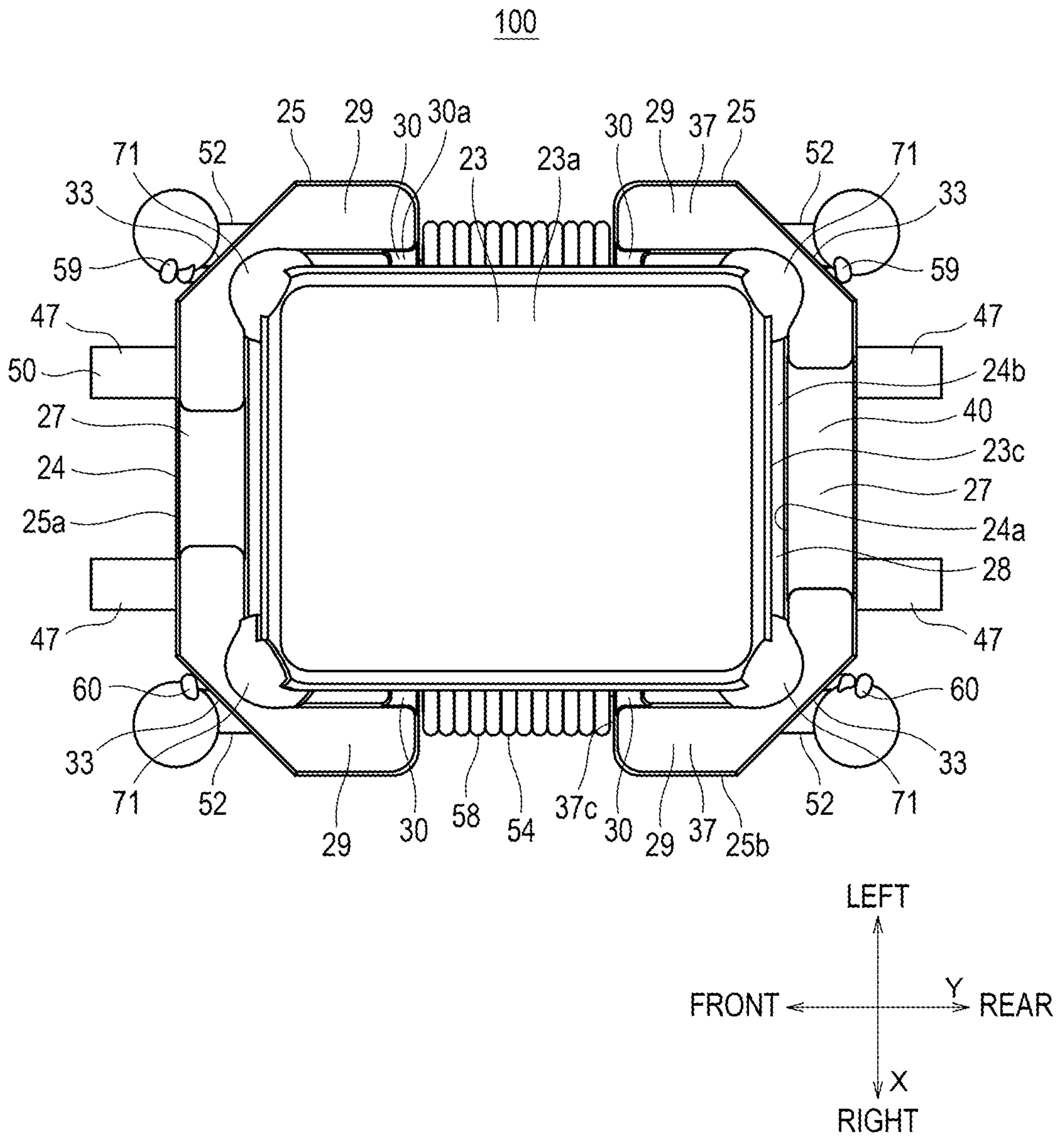
FIG. 4 is a plan view of the coil component according to the embodiment.

More specifically, for example, as illustrated in FIG. 4, the four corners of the second magnetic core 23 in a plan view are fixed to the flange housing portion 25 by the adhesive 71, respectively.

Here, since the manufacturing process of the magnetic core 10 and the second magnetic core 23 includes, for example, a baking process, there is a possibility that the dimensional tolerance due to the manufacturing variation of the magnetic core 10 and the second magnetic core 23 cannot be ignored.

In response to such circumstances, as illustrated in FIG. 7, there is a gap between the entire area of the inner peripheral wall surface 24*a* and the outer peripheral surface of the magnetic core 10. As a result, the magnetic core 10 can be housed in the housing region 46 even if the manufacturing variation of the magnetic core 10 occurs.

Similarly, there is a gap (except for the place where the adhesive 71 is formed) between the inner peripheral wall surface 24*a* and the side peripheral surface 23*c* of the second magnetic core 23, and even if the manufacturing variation of the second magnetic core 23 occurs, the second magnetic core 23 can be housed in the housing region 46.

The electrode terminal member 47 is made of a conductive material such as a metal material.

The electrode terminal member 47 is embedded in the insulation frame 24 by, for example, insert molding.

More specifically, the electrode terminal member 47 is embedded in, for example, a part below the internal bottom surface 24*b* (hereinafter, referred to as a terminal embedding portion 42) in the flange housing portion 25. Therefore, the electrode terminal member 47 is not exposed to the inner surface (internal bottom surface 24*b* and inner peripheral wall surface 24*a*) of the insulation frame 24. At least the upper surface side of the electrode terminal member 47 is covered with an insulating material constituting the insulation frame 24.

Therefore, the insulation frame 24 can more reliably obtain the insulation between the magnetic core 10 and the electrode terminal member 47 and the insulation between the second magnetic core 23 and the electrode terminal member 47.

In the case of the present embodiment, the coil component 100 includes four electrode terminal members 47. The electrode terminal members 47 are provided at four corners of the insulation frame 24 in a plan view, for example.

Each electrode terminal member 47 is formed by bending a metal piece, for example, and integrally has a mounting terminal 50 and a winding terminal 52. The mounting terminal 50 is a terminal for external connection, and a tip end portion of the coil 54 is connected to the winding terminal 52.

As illustrated in FIG. 7, the planar shape of the electrode terminal member 47 is, for example, a U shape.

The tip end portion of one half of the U-shape constitutes the mounting terminal 50, and the tip end portion of the other half constitutes the winding terminal 52.

The other half of the electrode terminal member 47 is disposed horizontally as a whole. The entire winding terminal 52 is located above the lower surface 40*a* of the base housing portion 40 (refer to FIG. 5).

One half described above of the electrode terminal member 47 is bent like a crank in a side view (refer to FIG. 5). The bent part includes a first horizontal part extending horizontally in an upper stage, a second horizontal part extending horizontally in a lower stage (the second horizontal part is the mounting terminal 50), and a vertically extending part that connects the first horizontal part and the second horizontal part to each other and extends vertically.

The first horizontal part is embedded in the terminal embedding portion 42.

The upper portion of the vertically extending part is embedded in the terminal embedding portion 42, and the lower portion of the vertically extending part protrudes downward from the terminal embedding portion 42 and further protrudes downward from the terminal protruding hole 45.

The second horizontal part (mounting terminal 50) is disposed lower than the winding terminal 52 (refer to FIG. 5). At least a part (at least the lower edge portion) of the mounting terminal 50 is disposed below the lower surface 40*a,* which is the lowermost surface of the insulation frame 24.

For example, the mounting terminal 50 and the winding terminal 52 of the two electrode terminal members 47 on the front side each protrude forward from the insulation frame 24 in a plan view. On the other hand, the mounting terminal 50 and the winding terminal 52 of the two electrode terminal members 47 on the rear side each protrude backward from the insulation frame 24 in a plan view.

Among the mounting terminal 50 and the winding terminal 52 of each electrode terminal member 47, the mounting terminal 50 is disposed closer to the center in the left-right direction, and the winding terminal 52 is disposed outside in the left-right direction. The mounting terminal 50 is disposed closer to the center with respect to the lateral protruding housing portion 37 in the X direction, for example.

The winding terminal 52 protrudes forward or backward from a portion above the lower surface 37*b* at the lower end portion of the lateral protruding housing portion 37.

More specifically, the winding terminal 52 protrudes forward or backward from the lower end portion of the chamfered shape portion 33. Therefore, as illustrated in FIG. 4, even if the protrusion length of the winding terminal 52 from the chamfered shape portion 33 is sufficiently secured, since the protrusion length of the winding terminal 52 forward or backward from the outward surface 25*a* can be set short, the plane dimension of the coil component 100 can be made compact.

For example, in the Y direction, a tip end position of the mounting terminal 50 is located outside a tip end position of the winding terminal 52.

As described above, the coil component 100 has, for example, two coils, the first coil 56 and the second coil 57.

The winding portion 58 of each coil (first coil 56, second coil 57) is wound around the intermediate portion 26 of the insulation frame 24. Since the core portion 11 of the magnetic core 10 is housed in the intermediate portion 26, the winding portion 58 is wound around the core portion 11 and the intermediate portion 26.

More specifically, each turn in the winding portion (each of the parts that make one round) is wound along the upper surface 11*a* of the core portion 11, one side surface 26*a* of the intermediate portion 26, the lower surface 26*b* of the intermediate portion 26, and the other side surface 26*a* of the intermediate portion 26.

Then, any one or more turns in the winding portion 58 are, for example, wound in a state of being in contact with the upper surface 11*a* of the core portion 11, one side surface 26*a* of the intermediate portion 26, the lower surface 26*b* of the intermediate portion 26, and the other side surface 26*a* of the intermediate portion 26.

Here, the inward surface 37*c* of the lateral protruding housing portion 37 and the inward surface 40*b* of the base housing portion 40 function as a flange that defines the position of the end portion of the winding portion 58 in the Y direction (refer to FIGS. 1 and 2, and the like). That is, the position of the front end portion of the winding portion 58 is defined (positioned) by the inward surface 40*b* of the flange housing portion 25 on the front side and the inward surface 37*c* on the left and right. Further, the position of the rear end portion of the winding portion 58 is defined (positioned) by the inward surface 40*b* of the flange housing portion 25 on the rear side and the inward surface 37*c* on the left and right.

As illustrated in FIG. 2, both end portions (one end portion 59 and the other end portion 60) of each coil (first coil 56 and second coil 57) are pulled down from the left end portion or right end portion at the end portion of the winding portion 58 in the Y direction and guided to the winding terminal 52 side along the chamfered shape portion 38 and the lower surface 37*b* of the lateral protruding housing portion 37.

For example, one end portion 59 of the first coil 56 is pulled out from the left end portion at the front end portion of the winding portion 58 of the first coil 56, and is guided to the winding terminal 52 side of the electrode terminal member 47 on the left front side along the chamfered shape portion 38 and the lower surface 37*b* of the lateral protruding housing portion 37 on the left front side.

Similarly, the other end portion 60 of the first coil 56 is, for example, pulled out from the right end portion at the front end portion of the winding portion 58 of the first coil 56, and is guided to the winding terminal 52 side of the electrode terminal member 47 on the right front side along the chamfered shape portion 38 and the lower surface 37*b* of the lateral protruding housing portion 37 on the right front side.

In addition, one end portion 59 of the second coil 57 is, for example, pulled out from the left end portion at the rear end portion of the winding portion 58 of the second coil 57, and is guided to the winding terminal 52 side of the electrode terminal member 47 on the left rear along the chamfered shape portion 38 and the lower surface 37*b* of the lateral protruding housing portion 37 on the left rear.

Similarly, the other end portion 60 of the second coil 57 is, for example, pulled out from the right end portion at the front end portion of the winding portion 58 of the second coil 57, and is guided to the winding terminal 52 side of the electrode terminal member 47 on the right rear along the chamfered shape portion 38 and the lower surface 37*b* of the lateral protruding housing portion 37 on the right rear.

In this way, since both end portions of each coil are guided to the corresponding winding terminal 52 side along the chamfered shape portion 38, damage to the insulating coating of the lead wire 55 can be suppressed.

Note that both end portions of each coil are located above the lower surface 40*a* of the base housing portion 40 (refer to FIG. 5). Therefore, when the coil component 100 is surface-mounted, interference between both end portions of each coil and the substrate can be suppressed.

Both end portions of each coil (first coil 56 and second coil 57) are wound and welded to the winding terminals 52 of each electrode terminal member 47 so as to be electrically and mechanically connected to the corresponding winding terminals 52.

That is, one end portion 59 of the first coil 56 is connected to the winding terminal 52 of electrode terminal member 47 on the left front, the other end portion 60 of the first coil 56 is connected to the winding terminal 52 of the electrode terminal member 47 on the right front, one end portion 59 of the second coil 57 is connected to the winding terminal 52 of the electrode terminal member 47 on the left rear, and the other end portion 60 of the second coil 57 is connected to the winding terminal 52 of the electrode terminal member 47 on the right rear.

Here, as illustrated in FIGS. 5 and 8, the height position of the upper end 31*a* of the fifth wall portion 31 is lower than a height position of an upper end 29*a* of the third wall portion 29. Therefore, when the height position of the upper surface 11*a* is lower than the height position of the upper surface 12*a,* such as when the thickness dimension of the core portion 11 is smaller than the height dimension of the flange portion 12, the distance between the upper surface 11*a* of the core portion 11 and the winding portion 58 of the coil 54 in the vertical direction can be suppressed.

In the case of the present embodiment, as illustrated in FIG. 8 and the like, the height position of the upper surface 11*a* of the core portion 11 is higher than the height position of the upper end 31*a* of the fifth wall portion 31, and the winding portion 58 is wound in contact with the upper surface 11*a* of the core portion 11. Therefore, it is possible to prevent the lead wire 55 from becoming an aerial wiring in the winding portion 58.

More specifically, the thickness dimension (vertical dimension) of the core portion 11 is larger than the height dimension of the fifth wall portion 31 (the standing height of the fifth wall portion 31 upward from the upper surface of the sixth wall portion 32). Therefore, the lower surface 11*b* of the core portion 11 is in contact with the upper surface of the sixth wall portion 32, but the height position of the upper surface 11*a* of the core portion 11 is higher than the height position of the upper end 31*a* of the fifth wall portion 31.

Here, the boundary between the side surface 11*c* and the upper surface 11*a* of the core portion 11 has a chamfered shape. Therefore, it is possible to suppress damage to the insulating coating of the lead wire 55 due to contact between the lead wire 55 constituting the winding portion 58 and the core portion 11, and it is possible to maintain the insulation performance of the insulating coating.

Further, as illustrated in FIG. 8 and the like, the height position of the upper end 31*a* of the fifth wall portion 31 is the same as or lower than the height position of the upper end 30*a* of the fourth wall portion 30.

In other words, the height position of the upper end 30*a* is equal to or higher than the height position of the upper end 31*a*. Therefore, since the fourth wall portion 30 can cover the fourth surface 20 in a wider area, the insulation between the magnetic core 10 (particularly the lateral protruding portion 17) and the electrode terminal member 47 is more reliably secured.

More specifically, the height position of the upper end 31*a* of the fifth wall portion 31 is lower than the height position of the upper end 30*a* of the fourth wall portion 30. In other words, the height position of the upper end 30*a* is higher than the height position of the upper end 31*a*. Therefore, the fourth wall portion 30 can cover the fourth surface 20 in a wider area, and the insulation between the magnetic core 10 (particularly the lateral protruding portion 17) and the electrode terminal member 47 is more reliably secured.

Further, the height position of the lower surface 23*b* of the second magnetic core 23 is lower than the height position of the upper end 29*a* of the third wall portion 29. That is, at least the lower end portion of the second magnetic core 23 can be covered by the third wall portion 29.

As a result, the insulation between the second magnetic core 23 and the electrode terminal member 47 can be secured.

In the case of the present embodiment, at least the lower end portion of the second magnetic core 23 is also covered by the first wall portion 27.

More specifically, in the case of the present embodiment, for example, as illustrated in FIGS. 5 and 8, the upper end portion of the second magnetic core 23 protrudes upward from the upper end 27*a* of the first wall portion 27 and the upper end 29*a* of the third wall portion 29.

Further, the height position of the upper end 30*a* of the fourth wall portion 30 is the same as or lower than the height position of the lower surface 23*b* of the second magnetic core 23.

As a result, even when the flat area of the second magnetic core 23 is large enough to overlap the second magnetic core 23 with the fourth wall portion 30 in a plan view (refer to FIG. 7), the interference with the fourth wall portion 30 and the second magnetic core 23 can be suppressed.

More preferably, as illustrated in FIG. 8 and the like, the height position of the upper end 30*a* of the fourth wall portion 30 is lower than the height position of the lower surface 23*b* of the second magnetic core 23.

More preferably, the height position of the upper end 30*a* of the fourth wall portion 30 is lower than the height position of the upper surface 12*a* of the flange portion 12.

Further, the height position of the upper end 30*a* of the fourth wall portion 30 is lower than the height position of the upper end 29*a* of the third wall portion 29. As a result, even when the flat area of the second magnetic core 23 is large enough to overlap the second magnetic core 23 with the fourth wall portion 30 in a plan view (refer to FIG. 7), at least the lower end portion of the second magnetic core 23 can be covered by the third wall portion 29 without the fourth wall portion 30 interfering with the second magnetic core 23. As a result, the insulation between the second magnetic core 23 and the electrode terminal member 47 can be secured.

In the case of the present embodiment, each of the pair of flange housing portions 25 houses at least the lower end portion of the second magnetic core 23.

As a result, the insulation between the second magnetic core 23 and the electrode terminal member 47 can be secured.

In the case of the present embodiment, the height position of the upper surface 12*a* of the flange portion 12 is lower than the height position of the upper end 29*a* of the third wall portion 29, lower than the height position of the upper end 27*a* of the first wall portion 27, lower than the height position of the bottom surface of the recessed portion 35 or the recessed portion 36 of the first wall portion 27, and higher than the height position of the upper end 30*a* of the fourth wall portion 30.

Further, in a part of the lateral protruding portion 17 of the flange portion 12 on the side of the fourth wall portion 30, a recessed portion 21 recessed with respect to the base portion 16 toward the outside in the axial direction of the core portion 11 is formed, and the fourth surface 20 is offset outward with respect to the inner side surface (inward surface 16*a*) of the base portion 16 (refer to FIG. 7). The fourth wall portion 30 is entered into the recessed portion 21.

As a result, it is possible to sufficiently secure the facing distance between the fourth wall portions 30 of the pair of flange housing portions 25, so that the forming range of the winding portion 58 in the axial direction of the core portion 11 can be more sufficiently secured. Therefore, it is possible to secure a sufficient number of turns of the lead wire 55 in the winding portion 58, or to use the lead wire 55 having a sufficiently large outer diameter.

Note that a magnetic flux density is small at a part of the lateral protruding portion 17 of the flange portion 12 on the side of the fourth wall portion 30, that is, at the end portion on the inner side of the lateral protruding portion 17, and the shape of the part has little effect on an effective magnetic path. That is, the characteristics of the coil component 100 can be suitably improved by forming the recessed portion 21 in a part having a small influence on the characteristics of the coil component 100 and disposing the fourth wall portion 30 in the recessed portion 21.

Further, as illustrated in FIG. 7, one part 34 of the third wall portion 29 is disposed on the inner side in the axial direction of the core portion 11 with respect to the flange portion 12. Similarly, one part 39 of the fourth wall portion 30 is disposed on the inner side in the axial direction of the core portion 11 with respect to the flange portion 12.

Here, a straight line L1 illustrated in FIG. 7 indicates the rear end position (position of the inward surface 16*a*) in the flange portion 12 on the front side. The one part 34 of the third wall portion 29 on the front side and the one part 39 of the fourth wall portion 30 on the front side are located behind the straight line L1. That is, the one part 34 and the one part 39 is disposed on the inner side in the axial direction of the core portion 11 with respect to the flange portion 12.

Therefore, as illustrated in FIG. 7, the inward surface 37*c* is disposed inward with respect to the inward surface 16*a*.

Further, as illustrated in FIG. 5, the inward surface 40*b* is disposed inward with respect to the inward surface 16*a*.

Here, as described above, the inward surface 37*c* of the lateral protruding housing portion 37 and the inward surface 40*b* of the base housing portion 40 function as a flange that defines the position of the end portion of the winding portion 58 in the Y direction.

Since the inward surface 37*c* and the inward surface 40*b* are arranged inward with respect to the inward surface 16*a*, it is possible to suppress the interference between the part constituting the winding portion 58 of the lead wire 55 and the flange portion 12. Therefore, it is possible to suppress damage to the insulating coating of the lead wire 55 due to contact between the flange portion 12 and the lead wire 55, and it is possible to maintain the insulation performance of the insulating coating.

Note that, as described above, there is a possibility that the dimensional tolerance due to the manufacturing variation of the magnetic core 10 cannot be ignored, but, the design position of the inward surface 37*c* is set so that the inward surface 37*c* is arranged inward with respect to the inward surface 16*a* even if the manufacturing variation of the magnetic core 10 occurs.

In the case of the present embodiment, each of the one parts 34 of the four third wall portions 29 on the front, rear, left, and right of the insulation frame 24, and each of the one parts 39 of the four fourth wall portions 30 on the front, rear, left, and right of the insulation frame 24, are arranged inward in the axial direction of the core portion 11 with respect to the flange portion 12.

As described above, each surface (first surface 13, third surface 15, fourth surface 20, step surface 18, and inward surface 16*a*) adjacent to the upper surface 12*a* of the flange portion 12 is orthogonal to the upper surface 12*a*. Further, as described above, the boundary between the upper surface 12*a* of the flange portion 12 and each surface adjacent to the upper surface 12*a* does not have a chamfered shape.

Therefore, the area of the upper surface 12*a* of the flange portion 12 is equal to a maximum value of a plan cross-sectional area of the flange portion 12. Therefore, a contact area between the upper surface 12*a* of the flange portion 12 and the lower surface 23*b* of the second magnetic core 23 can be sufficiently secured, so that excellent characteristics of the coil component 100 can be obtained.

As illustrated in FIG. 7, in a plan view, the second magnetic core 23 (plate core) is formed to be one size larger than the magnetic core 10. Then, as illustrated in FIG. 7, the magnetic core 10 is inside an outer line (indicated by the alternate long and short dashed line in FIG. 7) of the plate core (second magnetic core 23) in a plan view.

Therefore, even if the position of the second magnetic core 23 is displaced with respect to the magnetic core 10 in the horizontal direction, the fluctuation of the contact area between the upper surface 12*a* of the flange portion 12 and the lower surface 23*b* of the second magnetic core 23 can be suppressed. Therefore, the characteristics of the coil component 100 can be stably obtained. The displacement referred to here refers to those based on manufacturing variations and environmental factors such as temperature changes.

Note that, in the case of the present embodiment, the height position of the upper end 27*a* of the first wall portion 27 and the height position of the upper end 29*a* of the third wall portion 29 are equal to each other. However, the present invention is not limited to this example, and the height position of the upper end 27*a* may be higher than the height position of the upper end 29*a* or lower than the height position of the upper end 29*a*.

The coil component 100 can be assembled, for example, as follows.

First, the insulation frame 24 in which each electrode terminal member 47 is embedded is prepared in advance.

Next, the magnetic core 10 is inserted into the housing region 46 from above the insulation frame 24. That is, each of the pair of flange portions 12 is disposed inside each of the pair of flange housing portions 25, and the core portion 11 is disposed inside the intermediate portion 26. At this time, for example, the lower surface 10*a* of the magnetic core 10 is adhesively fixed to the internal bottom surface 24*b* of the insulation frame 24.

Next, the first coil 56 and the second coil 57 are wound around the core portion 11 and the intermediate portion 26 to form the winding portion 58, respectively. Then, both end portions (one end portion 59 and the other end portion 60) of the first coil 56 and the second coil 57 are wound with the corresponding winding terminals 52, and fixed to the winding terminals 52 by welding using a laser, for example. Note that a shape of the winding terminal 52 illustrated in FIG. 3 is a shape before welding, and a shape of the winding terminal 52 illustrated in other drawings is a shape after welding.

Next, the second magnetic core 23 is inserted into the housing region 46 from above the insulation frame 24. That is, both end portions of the second magnetic core 23 in the front-rear direction are disposed inside the upper end portions of the flange housing portions 25 on the front and rear, respectively. Here, the second magnetic core 23 is spanned between the upper surfaces 12*a* of the pair of flange portions 12.

Next, the second magnetic core 23 is fixed to the inner peripheral surface of the flange housing portion 25 with the adhesive 71.

In this way, the coil component 100 is obtained.

As an example, the coil component 100 can be used as a high withstand voltage pulse transformer, but the application of the coil component 100 is not limited to this example.

Although the embodiments have been described above with reference to the drawings, these are examples of the present invention, and various configurations other than the above can be adopted.

For example, in the above, an example in which the coil component 100 includes two coils (the first coil 56 and the second coil 57) has been described; however, the coil component 100 may have one coil.

Also, in the above, an example in which the magnetic core 10 includes the pair of flange portions 12 has been described; however, the magnetic core 10 may have one flange portion 12 of the pair of flange portions 12, and the second magnetic core 23 may have the other. That is, the coil component 100 may include two cores, each of which is formed in an L-shape.

Further, in the above, an example in which the number of flange portions of the magnetic core 10 is two has been described; however, the magnetic core 10 may include one further flange portion (third flange portion) between the pair of flange portions 12 described above. In this case, the coil is wound between one of the pair of flange portions 12 and the third flange portion, and between the third flange portion and the other flange portion 12, respectively.

Further, in the above, an example in which the coil component 100 includes two magnetic cores (magnetic core 10 and the second magnetic core 23) has been described; however, the coil component 100 may include a single annular magnetic core.

Further, in the above, an example in which at least the lower end portion of the second magnetic core 23 is covered by the flange housing portion 25 has been described; however, the entire second magnetic core 23 may be disposed above the flange housing portion 25. That is, the height position of the lower surface of the lower surface 23*b* of the second magnetic core 23 may be higher than the height position of the upper end of the flange housing portion 25.

Further, in the above, an example in which the second magnetic core 23 is adhesively fixed to the insulation frame 24 by the adhesive 71 scattered at a plurality of locations has been described; however, by filling the entire gap between the side peripheral surface 23*c* of the second magnetic core 23 and the inner peripheral wall surface 24*a* of the insulation frame 24 with an adhesive, the second magnetic core 23 may be adhesively fixed to the insulation frame 24. In this case, it is preferable that the upper end 30*a* of the fourth wall portion 30 is close to the lower surface 23*b* of the second magnetic core 23.

Further, the second magnetic core 23 may not be fixed to the insulation frame 24, and the lower surface 23*b* of the second magnetic core 23 may be adhesively fixed to the upper surface 12*a* of the flange portion 12.

Further, in the above, an example in which the electrode terminal member 47 includes the mounting terminal 50 and the winding terminal 52 separately has been described; however, the present invention is not limited to this example, and the winding terminal 52 also may serve as the mounting terminal 50.

Further, the mounting terminal 50 may be a pin terminal formed in a pin shape.

The present embodiment includes the following technical ideas.

(1) A coil component including:

a magnetic core having a core portion;

an insulation frame housing the magnetic core;

an electrode terminal member provided on the insulation frame; and at least one coil, which is formed of an insulatingly coated lead wire and is electrically connected to the electrode terminal member, wherein at least one coil includes a winding portion wound around the insulation frame and the core portion so as to be in contact with an outer surface of the insulation frame.

(2) The coil component according to (1), wherein the magnetic core includes a pair of flange portions disposed on both sides of the core portion in an axial direction of the core portion, each of the pair of flange portions protrudes from the core portion in a direction orthogonal to the axial direction of the core portion, the insulation frame includes an intermediate portion that houses the core portion and a pair of flange housing portions that houses each of the pair of flange portions, and the winding portion is wound around the core portion and the intermediate portion and is in contact with an outer surface of the intermediate portion.

(3) The coil component according to (2), wherein each of the pair of flange portions includes a first surface facing outward in the axial direction of the core portion, a second surface which is a lower surface of the flange portion, and a third surface which is a side surface of the flange portion, each of the pair of flange housing portions of the insulation frame includes a first wall portion that covers the first surface, a second wall portion that covers the second surface, a third wall portion that covers the third surface, and a fourth wall portion that is adjacent to the third wall portion and faces the first wall portion, each of the pair of flange portions includes a base portion disposed on an extension of the core portion in a plan view, and a lateral protruding portion protruding laterally from the base portion, and the fourth wall portion covers the fourth surface, which is a surface of the outer surface of the lateral protruding portion, facing the side opposite to the first surface.

(4) The coil component according to (3), wherein the intermediate portion includes a fifth wall portion that covers a side surface of the core portion, and a height position of an upper end of the fifth wall portion is lower than a height position of an upper end of the third wall portion.

(5) The coil component according to (4), wherein a height position of an upper surface of the core portion is higher than the height position of the upper end of the fifth wall portion, and the winding portion is wound in a state of being in contact with the upper surface of the core portion.

(6) The coil component according to (4) or (5), wherein the height position of the upper end of the fifth wall portion is the same as or lower than a height position of an upper end of the fourth wall portion.

(7) The coil component according to (5) or (6), wherein the height position of the upper end of the fifth wall portion is lower than a height position of an upper end of the fourth wall portion.

(8) The coil component according to any one of (3) to (7), wherein the height position of an upper end of the fourth wall portion is lower than a height position of the upper end of the third wall portion.

(9) The coil component according to any one of (3) to (8), further including:

a second magnetic core that constitutes a closed magnetic path together with the magnetic core, wherein a height position of a lower surface of the second magnetic core is lower than a height position of an upper end of the third wall portion.

(10) The coil component according to any one of (3) to (9), further including:

a second magnetic core that constitutes a closed magnetic path together with the magnetic core, wherein a height position of an upper end of the fourth wall portion is the same as or lower than a height position of the lower surface of the second magnetic core.

(11) The coil component according to any one of (3) to (10), wherein in a part of the lateral protruding portion on the fourth wall portion side, a recessed portion recessed toward the outside in the axial direction of the core portion with respect to the base portion is formed, and the fourth surface is offset outward from the inner side surface of the base portion, and the fourth wall portion is entered into the recessed portion.

(12) The coil component according to any one of (3) to (11), wherein one part of the third wall portion is disposed on the inner side in the axial direction of the core portion with respect to the flange portion.

(13) The coil component according to any one of (2) to (12), further including:

a second magnetic core that constitutes a closed magnetic path together with the magnetic core, wherein the second magnetic core is a plate core spanned between upper surfaces of the pair of flange portions, and an area of the upper surface of the flange portion is equal to a maximum value of a plan cross-sectional area of the flange portion.

(14) The coil component according to any one of (2) to (13), further including:

a second magnetic core that constitutes a closed magnetic path together with the magnetic core, wherein the second magnetic core is a plate core, and each of the pair of flange housing portions houses at least a lower end portion of the second magnetic core.

(15) The coil component according to any one of (1) to (14), further including:

a second magnetic core that constitutes a closed magnetic path together with the magnetic core, wherein the second magnetic core is a plate core, and the magnetic core is inside an outline of the plate core in a plan view.

(16) The coil component according to any one of (1) to (15), further including:

a second magnetic core that constitutes a closed magnetic path together with the magnetic core, wherein the second magnetic core is fixed to the insulation frame by an adhesive.

The invention claimed is:

1. A coil component comprising:

a magnetic core having a core portion;

an insulation frame housing the magnetic core;

an electrode terminal member provided on the insulation frame; and at least one coil, which is formed of an insulatingly coated lead wire and is electrically connected to the electrode terminal member, wherein at least one coil includes a winding portion wound around the insulation frame and the core portion so as to be in contact with an outer surface of the insulation frame, the magnetic core includes a pair of flange portions disposed on both sides of the core portion in an axial direction of the core portion, each of the pair of flange portions protrudes from the core portion in a direction orthogonal to the axial direction of the core portion, the insulation frame includes an intermediate portion that houses the core portion and a pair of flange housing portions that houses each of the pair of flange portions, the winding portion is wound around the core portion and the intermediate portion and is in contact with an outer surface of the intermediate portion, each of the pair of flange portions includes a first surface facing outward in the axial direction of the core portion, a second surface which is a lower surface of the flange portion, and a third surface which is a side surface of the flange portion, each of the pair of flange housing portions of the insulation frame includes a first wall portion that covers the first surface, a second wall portion that covers the second surface, a third wall portion that covers the third surface, and a fourth wall portion that is adjacent to the third wall portion and faces the first wall portion, each of the pair of flange portions includes a base portion disposed on an extension of the core portion in a plan view, and a lateral protruding portion protruding laterally from the base portion, the fourth wall portion covers the fourth surface, which is a surface of the outer surface of the lateral protruding portion, facing the side opposite to the first surface, the intermediate portion includes a fifth wall portion that covers a side surface of the core portion, and a height position of an upper end of the fifth wall portion is lower than a height position of an upper end of the third wall portion.

2. The coil component according to claim 1, wherein a height position of an upper surface of the core portion is higher than the height position of the upper end of the fifth wall portion, and the winding portion is wound in a state of being in contact with the upper surface of the core portion.

3. The coil component according to claim 1, wherein the height position of the upper end of the fifth wall portion is the same as or lower than a height position of an upper end of the fourth wall portion.

4. The coil component according to claim 2, wherein the height position of the upper end of the fifth wall portion is lower than a height position of an upper end of the fourth wall portion.

5. A coil component comprising:

a magnetic core having a core portion;

an insulation frame housing the magnetic core;

an electrode terminal member provided on the insulation frame; and at least one coil, which is formed of an insulatingly coated lead wire and is electrically connected to the electrode terminal member, wherein at least one coil includes a winding portion wound around the insulation frame and the core portion so as to be in contact with an outer surface of the insulation frame, the magnetic core includes a pair of flange portions disposed on both sides of the core portion in an axial direction of the core portion, each of the pair of flange portions protrudes from the core portion in a direction orthogonal to the axial direction of the core portion, the insulation frame includes an intermediate portion that houses the core portion and a pair of flange housing portions that houses each of the pair of flange portions, the winding portion is wound around the core portion and the intermediate portion and is in contact with an outer surface of the intermediate portion, each of the pair of flange portions includes a first surface facing outward in the axial direction of the core portion, a second surface which is a lower surface of the flange portion, and a third surface which is a side surface of the flange portion, each of the pair of flange housing portions of the insulation frame includes a first wall portion that covers the first surface, a second wall portion that covers the second surface, a third wall portion that covers the third surface, and a fourth wall portion that is adjacent to the third wall portion and faces the first wall portion, each of the pair of flange portions includes a base portion disposed on an extension of the core portion in a plan view, and a lateral protruding portion protruding laterally from the base portion, the fourth wall portion covers the fourth surface, which is a surface of the outer surface of the lateral protruding portion, facing the side opposite to the first surface, and a height position of an upper end of the fourth wall portion is lower than a height position of the upper end of the third wall portion.

6. A coil component comprising:

a magnetic core having a core portion;

an insulation frame housing the magnetic core;

an electrode terminal member provided on the insulation frame;

at least one coil, which is formed of an insulatingly coated lead wire and is electrically connected to the electrode terminal member; and a second magnetic core that constitutes a closed magnetic path together with the magnetic core, wherein at least one coil includes a winding portion wound around the insulation frame and the core portion so as to be in contact with an outer surface of the insulation frame, the magnetic core includes a pair of flange portions disposed on both sides of the core portion in an axial direction of the core portion, each of the pair of flange portions protrudes from the core portion in a direction orthogonal to the axial direction of the core portion, the insulation frame includes an intermediate portion that houses the core portion and a pair of flange housing portions that houses each of the pair of flange portions, the winding portion is wound around the core portion and the intermediate portion and is in contact with an outer surface of the intermediate portion, each of the pair of flange portions includes a first surface facing outward in the axial direction of the core portion, a second surface which is a lower surface of the flange portion, and a third surface which is a side surface of the flange portion, each of the pair of flange housing portions of the insulation frame includes a first wall portion that covers the first surface, a second wall portion that covers the second surface, a third wall portion that covers the third surface, and a fourth wall portion that is adjacent to the third wall portion and faces the first wall portion, each of the pair of flange portions includes a base portion disposed on an extension of the core portion in a plan view, and a lateral protruding portion protruding laterally from the base portion, the fourth wall portion covers the fourth surface, which is a surface of the outer surface of the lateral protruding portion, facing the side opposite to the first surface, and a height position of a lower surface of the second magnetic core is lower than a height position of the upper end of the third wall portion.

7. The coil component according to claim 1, further comprising:

a second magnetic core that constitutes a closed magnetic path together with the magnetic core, wherein a height position of an upper end of the fourth wall portion is the same as or lower than a height position of a lower surface of the second magnetic core.

8. The coil component according to claim 1, wherein in a part of the lateral protruding portion on the fourth wall portion side, a recessed portion recessed toward the outside in the axial direction of the core portion with respect to the base portion is formed, and the fourth surface is offset outward with respect to an inner side surface of the base portion, and the fourth wall portion is entered into the recessed portion.

9. The coil component according to claim 1, wherein one part of the third wall portion is disposed on the inner side in the axial direction of the core portion with respect to the flange portion.

10. The coil component according to claim 1, further comprising:

a second magnetic core that constitutes a closed magnetic path together with the magnetic core, wherein the second magnetic core is a plate core spanned between upper surfaces of the pair of flange portions, and an area of the upper surface of the flange portion is equal to a maximum value of a plan cross-sectional area of the flange portion.

11. The coil component according to claim 1, further comprising:

a second magnetic core that constitutes a closed magnetic path together with the magnetic core, wherein the second magnetic core is a plate core, and each of the pair of flange housing portions houses at least a lower end portion of the second magnetic core.

12. The coil component according to claim 1, further comprising:

a second magnetic core that constitutes a closed magnetic path together with the magnetic core, wherein the second magnetic core is a plate core, and the magnetic core is inside an outline of the plate core in a plan view.

13. The coil component according to claim 1, further comprising:

a second magnetic core that constitutes a closed magnetic path together with the magnetic core, wherein the second magnetic core is fixed to the insulation frame by an adhesive.

* * * * *